US012795369B2

(12) United States Patent
Alabssi

(10) Patent No.: US 12,795,369 B2
(45) Date of Patent: Nov. 10, 2026

(54) METHODS AND SYSTEMS FOR VIRTUAL SUBSCRIBER IDENTITY MODULE (vSIM) FRAUD DETECTION

(71) Applicant: T-Mobile USA, Inc., Bellevue, WA (US)

(72) Inventor: Yousef Alabssi, Budd Lake, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 318 days.

(21) Appl. No.: 18/439,571

(22) Filed: Feb. 12, 2024

(65) Prior Publication Data

US 2025/0260987 A1 Aug. 14, 2025

(51) Int. Cl.

| | |
|---|---|
| ***H04L 9/00*** | (2022.01) |
| ***H04W 8/02*** | (2009.01) |
| ***H04W 12/12*** | (2021.01) |
| ***H04W 12/72*** | (2021.01) |

(52) U.S. Cl.

CPC ............. *H04W 12/12* (2013.01); *H04W 8/02* (2013.01); *H04W 12/72* (2021.01)

(58) Field of Classification Search

CPC ......... G06F 3/167; H04W 12/12; H04W 8/02; H04W 12/72; G06Q 20/108; G06Q 40/025; G10L 13/00

See application file for complete search history.

(56) References Cited

U.S. PATENT DOCUMENTS

| | | | | |
|---|---|---|---|---|
| 2014/0302822 | A1* | 10/2014 | Ye | H04W 4/12 455/412.2 |
| 2017/0332281 | A1* | 11/2017 | Bouvet | H04W 76/10 |
| 2017/0374528 | A1* | 12/2017 | Bolon | H04W 24/08 |
| 2020/0236533 | A1* | 7/2020 | Wane | G06F 9/45533 |

* cited by examiner

*Primary Examiner* — Phuoc H Doan

(74) *Attorney, Agent, or Firm* — Lee & Hayes, P.C.

(57) ABSTRACT

Methods and systems for virtual subscriber identity module (vSIM) fraud detection are described herein. In one implementation, a mobility management entity (MME) of a Long-Term Evolution (LTE) network may obtain per call measurement data (PCMD) associated with a plurality of phone calls and/or service usage connected through the LTE network. The MME may aggregate the PCMD collected from all MMEs in the LTE network during a time period. The MME may determine, based on the aggregated PCMD, a first set of suspicious calls that are inbound roaming calls with respect to the corresponding MME and made from an unknown mobile device. The MME may further apply one or more detection logic to determine the potential vSIM fraud calls. In implementations, the one or more detection logic may be built based on the count of initial attach attempts, the count of visited markets, the count of device change events, etc.

20 Claims, 8 Drawing Sheets

500

COUNT BY MARKET
502

COUNT BY ACCESS NETWORK
504

METHODS AND SYSTEMS FOR VIRTUAL SUBSCRIBER IDENTITY MODULE (vSIM) FRAUD DETECTION

BACKGROUND

Virtual subscriber identity module (vSIM) has become a fraudulent practice within the telecommunication industry. vSIM fraudulent practice exploits the vSIM cards (e.g., digital SIM cards and/or physical SIM cards) stored in a SIM farm or a SIM server, allowing the users to associate multiple devices with a single identity. The replication and management of the collection of vSIM cards may be performed through software emulation. As the vSIM cards can be provisioned and utilized remotely, a single SIM card number or a single International Mobile Subscriber Identity (IMEI) number can be associated with multiple users in diverse geographic locations. However, the multiple users only pay for the usage associated with the single SIM card or the single IMEI number, thus, causing revenue loss for the wireless service providers. In addition, the vSIM fraudulent practice may also violate regulations and contractual agreements between the subscribers and the service provider. Therefore, there is a need to effectively detect the vSIM fraud activities to protect the integrity of the telecommunication networks and prevent revenue loss to the service providers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
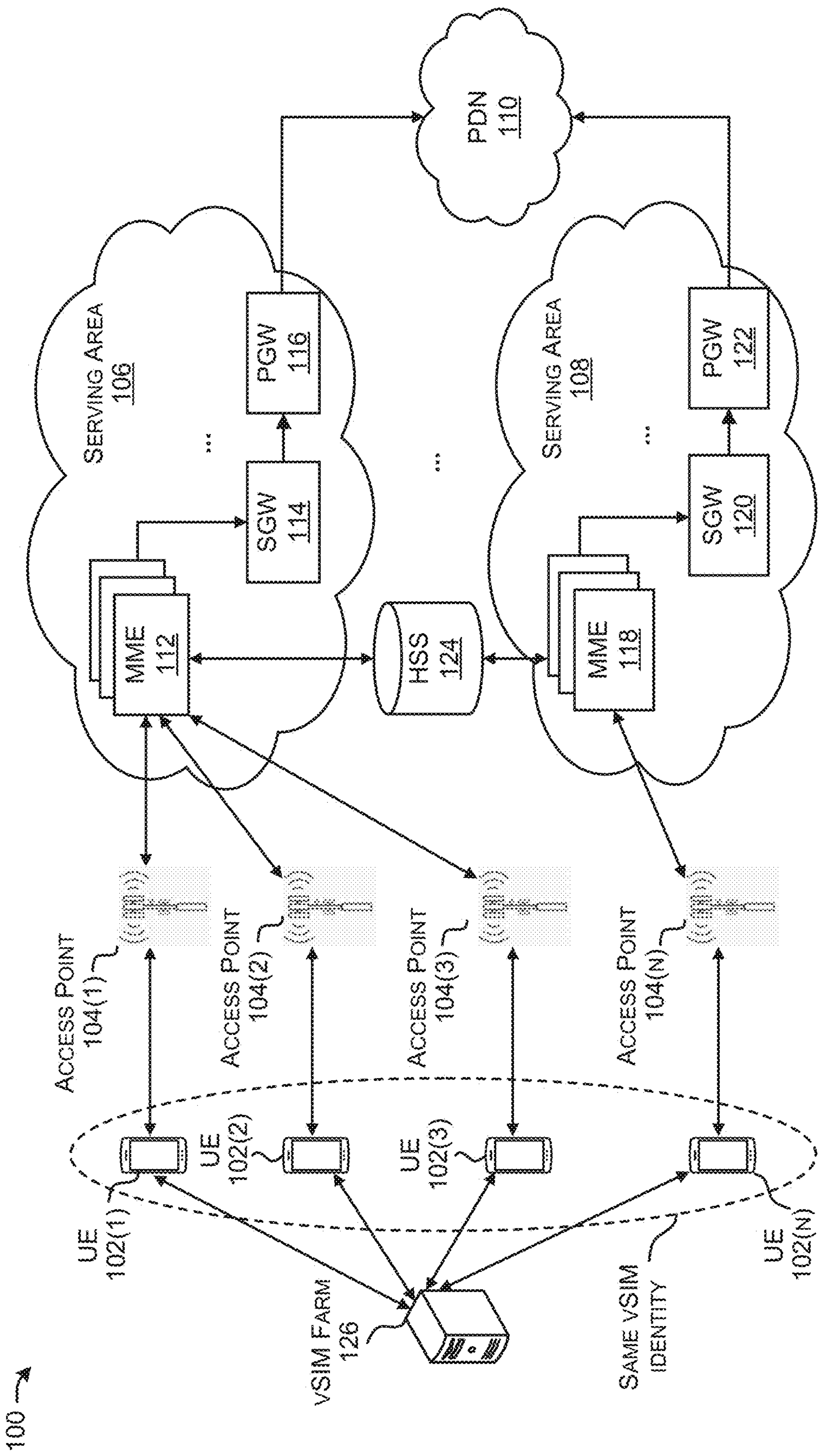
FIG. 1 illustrates an example environment, in which techniques for detecting a virtual Subscriber Identity Module (vSIM) fraud in a Long-Term Evolution (LTE) network are implemented, according to an implementation of the present disclosure.

Techniques for detecting a virtual Subscriber Identity Module (vSIM) fraud in a Long-Term Evolution (LTE) network are disclosed herein.

According to an aspect of the present disclosure, a computer device comprises a processor and a non-transitory computer-readable memory storing computer-executable instructions that, when executed by the processor, cause the processor to perform operations to detect a vSIM fraud in an LTE network. In implementations, the computer device may perform an operation to obtain data associated with a plurality of phone calls made in the LTE network during a time period. Alternatively and/or additionally, the computer device may perform an operation to obtain data related to data service usage in the LTE network in the time period. The computer device may further perform an operation to determine, based on the data, a first set of phone calls that satisfy a first criteria. In implementations, the first criteria may include inbound roaming calls made from unrecognized devices. Further, the computer device may perform an operation to determine, based on the data associated with the first set of phone calls, one or more identities that satisfies a second criteria. In implementations, the one or more second criteria may include a count of initial attach attempts during the time period, a count of visited markets or locations during the time period, a count of device change events during the time period, etc. The computer device may perform an operation to determine that the one or more identities are associated with a virtual subscriber identity module (vSIM) fraud.

In implementations, the computer device may determine, based on the data associated with aa particular identity, that the number of initial attach attempts made from the particular identity equals to or greater than a first threshold. When the number of initial attach attempts from the particular identity equals to or greater than a first threshold, the computer device may determine the particular identity is associated with the vSIM fraud.

In implementations, the computer device may determine, based on the data associated with the particular identity, that the number of locations where the particular identity called from in the time period equals to or greater than a second threshold. When the number of locations where the particular identity called from in the time period equals to or greater than the second threshold, the computer device may determine the particular identity is associated with the vSIM fraud.

In implementations, the computer device may determine, based on the data associated with the particular identity, that the number of devices that the particular identity called from in the time period equals to or greater than a third threshold. When the number of devices that the particular identity called from in the time period equals to or greater than the third threshold, the computer device may determine the particular identity is associated with the vSIM fraud.

In implementations, the data associated with the first set of phone calls include per call measurement data (PCMD) associated with the first set of phone calls.

In implementations, the one or more identities include International Mobile Subscriber Identities (IMSIs).

The techniques discussed herein may be implemented in a computer network using one or more of protocols including but are not limited to Ethernet, third generation (3G), fourth generation (4G), Long-Term Evolution (LTE), fifth generation (5G), sixth generation (6G), the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example environment, in which techniques for detecting a virtual Subscriber Identity Module (vSIM) fraud in a Long-Term Evolution (LTE) network are implemented, according to an implementation of the present disclosure.

The network scenario 100, as illustrated in FIG. 1, may be part of a telecommunication network of a wireless service provider such as, T-Mobile, AT&T, Sprint, Verizon Wireless, etc. The telecommunication network may include one or more core networks such as Long-Term Evolution (LTE) network, 4G Evolved Packet Core (EPC) network, a 5G core network, etc. The network scenario 100 may include a packet data network (PDN) 110, one or more access points 104(1), 104(2), 104(3), . . . , **104(*n*) (hereinafter referred to as access point 104), and one or more network function entities to facilitate a user equipment (UE) such as UE 102(1), UE 102(2), UE 102(3), . . . , UE 102(*n*) (hereinafter referred to as UE 102) to connect to the PDN 110**.

The one or more access points 104 may be located in a radio access network (RAN) compatible with various radio access technologies (RATs), such as 5G NR, 4G/LTE, HSDPA/HSPA+, UMTS, CDMA, GSM, WiMAX, Wi-Fi, and/or any other previous or future generation of radio access technology. The one or more access points 104 may include eNBs compatible with 4G/LTE, gNBs compatible with 5G NR, or 2G and 3G base stations compatible with GSM and CDMA RATs, respectively.

The PDN 110 may be a public data network established for providing data service for the public. Although not shown, the network scenario 100 may further include an IP multimedia system (IMS) that delivers voice (VoIP) and other multimedia services to the UEs over the PDN 110.

The one or more network functions/entities may be associated with the telecommunication network of a wireless service provider. The telecommunication network may include one or more core networks such as 4G EPC network, 4G/LTE network, and/or the 5G core network. Each of the one or more core networks may include one or more serving areas such as serving area 106 and serving area 108. By way of examples and without limitation, the serving area 106 may include one or more mobility management entity (MME) 112, a serving gateway (SGW) 114, and a PDN gateway (PGW) 116. The MME 112 may be configured to provide mobility session management for the 4G/LTE network and support subscriber authentication, roaming and handovers to other networks. The SGW 114 may be configured to route the data packets from the access point 104 to the PGW 116 or vice versa. The PGW 116 may be configured to assign IP addresses to UEs, filter/inspect packets, and support selected functionalities in the network and act as an interface between the 4G/LTE network and the PDN 110. Similarly, the serving area 108 may include one or more mobility management entity (MME) 118, a serving gateway (SGW) 120, and a PDN gateway (PGW) 122. In some examples, each of the one or more core networks may also include a home subscriber server (HSS) 124 as a central database that stores data associated with the subscribers and user authentication. As illustrated, the HSS 124 may be accessible by the MMEs located in different service areas of a 4G/LTE network.

The UE 102 may be a mobile device, such as a cellular phone or a smart phone, a personal digital assistant (PDA), a media player, a tablet computer, a gaming device, a personal computer (PC) such as a laptop, desktop, or workstation, or any other type of computing or communication device. In some examples, the UE 102 may include the computing devices implemented on the vehicle such as an autonomous vehicle or a self-driving vehicle. In some other examples, the UE 102 may be a wearable device such as a smart watch, smart glasses, etc.

As discussed herein, a user may activate the mobile service subscription using a physical SIM card and/or a digital SIM card. When a digital SIM card (also referred to as eSIM) is used, the user may activate the mobile service subscription using a software or a mobile app with no need to insert a physical SIM card to the UE (e.g., UE 102). An International Mobile Equipment Identity (IMEI) number of the UE that is used for activation may be associated with the physical SIM card and/or the digital SIM card and stored in HSS 124. However, some party such as a SIM farm 126, may comprise a multitude of virtual SIM cards that are normally the physical SIM cards and/or digital SIM cards replicated and managed through software emulation. Virtual SIM cards may be provisioned and utilized remotely and/or on various types of UEs with no need to acquire and insert a physical SIM card int the devices and/or using a mobile app to activate the digital SIM card. For example, some of the UE 102(1), UE 102(2), UE 102(3), . . . , and UE **102(*n*) may use the same identity data associated with a physical SIM card and/or a digital SIM card to use the mobile service by connecting to the respective access points, e.g., access point 104(1), access point 104(2), access point 104(3), . . . , and access point 104(*n*)**.

From the network side, multiple initial attach attempts associated with a same SIM card may be observed during a time period, e.g., an hour, a few hours, or a day. In some instances, the multiple initial attach attempts may be captured by MMEs located in different geographic areas so far apart that the user associated with the same SIM card cannot be reasonably present in the different geographic areas during the time period. In yet some instances, the multiple initial attach attempts may be made through different types of devices during the time period, e.g., an Phone, an Pad, an Android phone, a Google phone, a virtual reality (VR) device, etc. As the purpose of vSIM is to enable users to utilize a particular device while exploiting a SIM card stored on the SIM farm 126 without incurring the full cost of a dedicated SIM card, the fraudulent practice of the SIM farm 126 causes revenue loss to the wireless service providers. The fraudulent practice may also violate regulations and contractual agreements with the wireless service providers.

The present disclosure utilizes the call data, particularly, the per call measurement data (PCMD) collected from all of the MMEs in the network across all network areas or network pools, applies filtering techniques to detect suspicious signaling and mobility patterns that may be related to a vSIM fraud and SIM farm activity. In some examples, the techniques may be implemented on a computer device (not shown) in the network and configured to collect the call data from all of the MMEs in the network. The computer device may be a centralized computer server in the network. Alternatively or additionally, the computer device may be located in a particular serving area, e.g., serving area 106 or serving area 108. In some examples, an MME may be designated to collect the call data from all other MMEs in the network. In implementations, among all the call data, the computer device and/or the MME may select those associated with inbound roaming activities. For example, for call data from the MME 112, the computer device may select the call data indicating roaming activities into the serving area 106. Alternatively and/or additionally, the computer device may select the call data associated with an unknown device. For example, the computer device may query the HSS 124 using the calling SIM card number. If the IMEI number of the device used during activation of the service does not match the IMEI number of the device currently being used, the computer device may mark the call data as a suspicious call sample.

As discussed herein, after collecting and aggregating the call data from all of the MMEs in the network, the computer device and/or the MME may build a suspicious call data set. Each of the suspicious call sample may reflect an inbound roaming activity and have an unknown device identity. The computer device and/or the MME may further apply one or more detection logic to identify one or more call patterns. Based on the identified one or more call patterns, the computer device and/or the MME may determine whether a suspicious call sample can be categorized as a potential vSIM fraud. In some examples, a first detection logic may be built based on the number of initial attach attempts. If multiple initial attach attempts are observed for a SIM card number and/or an IMEI number during a time period and the number of the initial attach attempts satisfied a criteria, the computer device and/or the MME may apply one or more second detection logic to further analyze the call behavior. For example, a second detection logic may be built based on the locations or markets where the multiple initial attach attempts are observed. If the multiple initial attach attempts are made from a number of locations or markets, yet it is impossible for the same SIM card and/or the same IMEI number to be present in the number of locations or markets during the time period, the computer device and/or the MME may label the SIM card number and/or the IMEI number as a potential vSIM fraud. In another examples, a second detection logic may be built based on the devices being used during the time period. If the same SIM card number and/or the same IMEI number is used in multiple devices and the number of the device changes satisfies a threshold, the computer device and/or the MME may label the SIM card number as a potential vSIM fraud. In implementations, the computer device and/or the MME may periodically scrutinize the call data from the MMEs, e.g., in a daily basis, a weekly basis, or per month, and generate a data set representing the suspicious vSIM fraud activities. The data set representing the suspicious vSIM fraud activities may be further presented to business units of the wireless service providers to take proper actions to regulate such fraud activities.

By analyzing the per call measurement data (PCMD) collected from all of the MMEs in the network, the present disclosure can effectively identify unusual call patterns and detect potential vSIM fraud activities. The analysis result of the potential vSIM fraud activities can further assist the wireless service provider to address such fraudulent activities to maintain the integrity of the telecommunication network and protect against potential revenue loss.

It should be appreciated that the network scenario 100 is for the purpose of illustration. The present disclosure is not intended to be limiting. The techniques discussed herein may be implemented in a computer network using one or more of protocols including but are not limited to Ethernet, third generation (3G), fourth generation (4G), Long-Term Evolution (LTE), fifth generation (5G), sixth generation (6G), the further radio access technologies, or any combination thereof. In some examples, the network implementations may support standalone architectures, non-standalone architectures, dual connectivity, carrier aggregation, etc.

Figure 2:
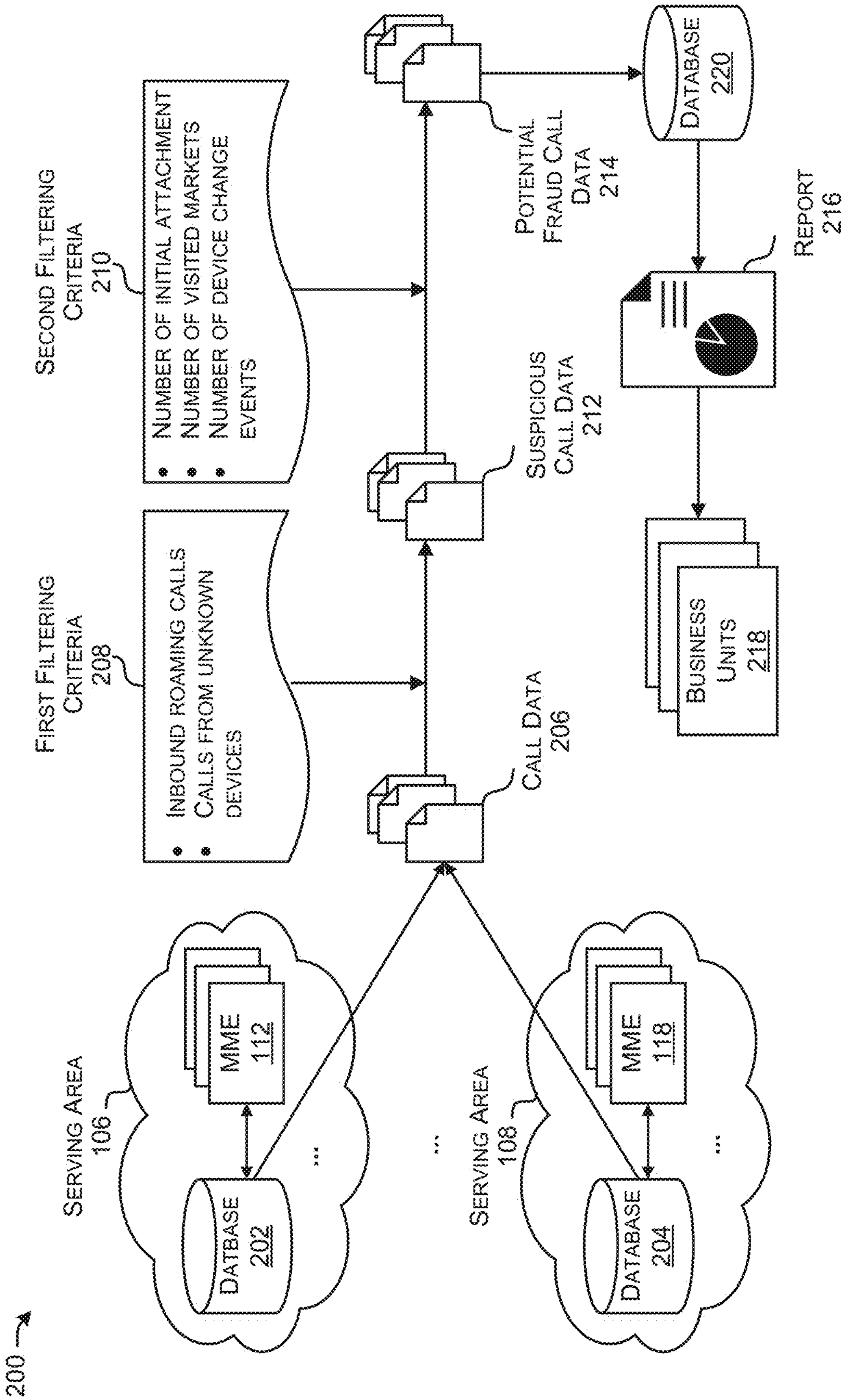
FIG. 2 illustrates an example diagram for detecting a virtual Subscriber Identity Module (vSIM) fraud in a Long-Term Evolution (LTE) network, according to an implementation of the present disclosure.

FIG. 2 illustrates an example diagram for detecting a virtual Subscriber Identity Module (vSIM) fraud in a Long-Term Evolution (LTE) network, according to an implementation of the present disclosure.

As illustrated in the example diagram 200, call data associated with the service provided through MMEs 112 of the serving area 106 may be stored in a database 202 and call data associated with the service provided through MMEs 118 of the serving area 108 may be stored in a database 204. Call data from the database 202 and the database 204 may be retrieved and aggregated to call data 206 by a computer device. A computer device and/or an MME may apply a first filtering criteria 208 to the call data 206 to generate suspicious call data 212. In some examples, the first filtering criteria 208 may indicate whether the service is related to an inbound roaming call relative to the serving area. Alternatively and/or additionally, the first filtering criteria 208 may indicate whether the call is from an unknown device, e.g., the IMEI of the device not matching the IMEI of the device when the service is activated. In implementations, the computer device and/or the MME may retrieve the PCMD from the call data. Based on the PCMD of all the calls, the computer device may determine a number of attach requests received from a particular SIM card number and/or the same IMEI number during a time period, one or more locations the particular SIM card number and/or the particular IMEI number is present during the time period, one or more devices the particular SIM card and/or the particular IMEI number is associated with during the time period, etc.

The computer device and/or the MME may further apply a second filtering criteria 210 to the suspicious call data 212 to generate potential fraud call data 214. In some examples, the second filtering criteria 210 may include a number of initial attachment, a number of visited markets, and/or a number of device change events. In implementations, the computer device may pass the suspicious call data 212 through a cascaded detection logic corresponding to one or more of the second filtering criteria 210. The orders of the detection logic corresponding to one or more of the second filtering criteria 210 may vary. For instance, the computer device may pass the suspicious call data 212 to a first detection logic corresponding to the number of initial attachment and then to a second detection logic corresponding to the number of visited markets and/or the number of device change events. Alternatively, the computer device may pass the suspicious call data 212 to the second detection logic and then to the first detection logic. In some examples, the computer device may apply a combination of the number of initial attachment and the number of visited markets to determine whether a SIM card is a potential fraud. In other examples, the computer device may apply a combination of the number of initial attachment and the number of device change events to determine whether a SIM card is a potential fraud. In yet other examples, the computer device may apply a combination of the number of visited markets and the number of device change events to determine whether a SIM card is a potential fraud. The potential fraud call data 214 may be stored in a database 220. In some examples, a report 216 may be generated based on the potential fraud call data 214 and presented to business units 218 of the wireless service providers.

Figure 3:
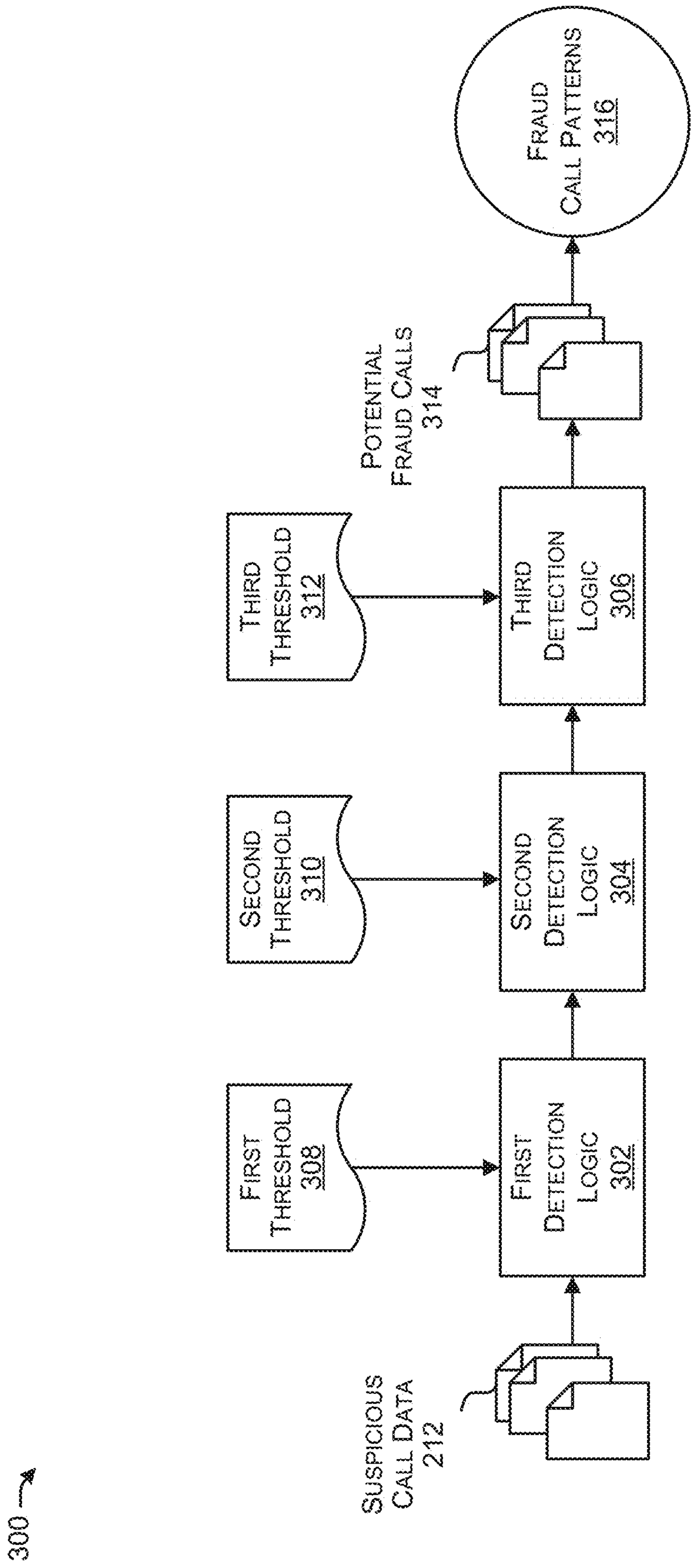
FIG. 3 illustrates another example diagram for detecting a virtual Subscriber Identity Module (vSIM) fraud in a Long-Term Evolution (LTE) network, according to an implementation of the present disclosure.

FIG. 3 illustrates another example diagram for detecting a virtual Subscriber Identity Module (vSIM) fraud in a Long-Term Evolution (LTE) network, according to an implementation of the present disclosure.

As illustrated, the example diagram 300 for detecting a virtual Subscriber Identity Module (vSIM) fraud in a Long-Term Evolution (LTE) network may include a first detection logic 302, a second detection logic 304, and a third detection logic 306. A computing device and/or an MME may configure a threshold for each of the first detection logic 302, the second detection logic 304, and the third detection logic 306. For examples, the computer device may configure a first threshold 308 for the first detection logic 302, a second threshold 310 for the second detection logic 304, and a third threshold 312 for the third detection logic 306. The suspicious call data 212, after passing through the first detection logic 302, the second detection logic 304, and the third detection logic 306, may be filtered to generate the potential fraud call data 212. Each potential fraud call in the potential fraud call data 212 may exhibit one or more fraud call patterns.

In some examples, the first detection logic 302 may be built to detect a potential vSIM fraud based on a number of initial attachment. As discussed herein, a user equipment (e.g., UE 102(1) of FIG. 1) may transmit an attach request to a base station, an eNodeB, or a gNodeB (e.g., access point 104(1) of FIG. 1). The access point 104(1) may forward the attach request to an MME (e.g., MME 112 in service area 108 of FIG. 1). The MME 112 may query an HSS (e.g., HSS 124 of FIG. 1) for user authentication. Once the authentication succeeds, a SGW (e.g., SGW 114) may be assigned to the MME 112 based on its location information. A packet data unit (PDU) session may be further established between the MME 112 and a PGW (e.g., PGW 116 of FIG. 1). As discussed herein, in a vSIM fraud practice, the same SIM card, either physical or virtual, and/or the same IMEI number, may be replicated and used by different user equipment in different locations. In some circumstances, an MME at a different location or a different serving area (e.g., MME 118 in service area 108 of FIG. 1) may receive another attach request associated with the same SIM card number. The computer device and/or the MME may configure the first threshold 308 to be a threshold number of the initial attachment or a threshold number of the initial attach attempts received by all the MMEs in the network. In some examples, the first threshold 308 may be set as maximum eight initial attachment or initial attach attempts in the entire network in one day. When the number of the initial attachment or the initial attach attempts associated with a SIM card number and/or an IMEI number satisfied the first threshold 308, the computer device and/or the MME may determine that the SIM card number is likely related to a vSIM fraud.

In some examples, the second detection logic 304 may be built to detect a potential vSIM fraud based on a number of visited markets. For example, a same SIM card number and/or a same IMEI number may be observed to have attached to the network or have attempted to attach to the network from two or more geographic locations during a time period. In some circumstances, the same SIM card number and/or a same IMEI number may be used to attach to the network and/or attempt to attach to the network within three hours from the two or more geographic locations far apart such as Seattle and New York City. In yet some circumstances, the same SIM card number and/or a same IMEI number may be used to attach to the network and/or attempt to attach to the network within a day from multiple cities across the county. The computer device and/or the MME may configure the second threshold 310 to be a threshold number of visited markets or visited locations. For example, the second threshold 310 may be set as maximum four visited markets in one day. When the number of visited markets associated with a SIM card number and/or a same IMEI number satisfied the second threshold 310, the computer device and/or the MME may determine that the SIM card number is likely related to a vSIM fraud. If the call data of the SIM card number and/or the same IMEI number passes through the first detection logic 302 and the second detection logic 304, and the PCMD of the call data of the SIM card number indicates that both the first threshold 308 and the second threshold 310 are satisfied, the computer device and/or the MME may determine that the SIM card number has greater possibility to be related to a vSIM fraud.

In some examples, the third detection logic 306 may be built to detect a potential vSIM fraud based on a number of device change events. For example, a same SIM card number and/or a same IMEI number may be observed to have attached to the network or have attempted to attach to the network from two or more different devices during a time period. As discussed herein, a particular SIM card number, when used to activate the service, may be bonded to a device ID, e.g., an IMEI number of the device. Such information may be stored in an HSS of the network (e.g., HSS 124 of FIG. 1). As a user could have more than one electronic device that is compatible with the SIM card, either physical or digital, a device change event may be observed occasionally. However, frequent device change may be unusual. The computer device and/or the MME may configure the third threshold 312 to be a threshold number of device change events. In some examples, the third threshold 312 may be set as maximum three device change events in a day. When the number of device change events satisfies the third threshold 312, the computer device and/or the MME may determine that the SIM card number and/or the IMEI number is likely related to a vSIM fraud. If the call data of the SIM card number and/or the IMEI number passes through the first detection logic 302 and the third detection logic 306 and satisfied both the first threshold 308 and the second threshold 310, the computer device may determine that the SIM card number has greater possibility to be related to a vSIM fraud. In some examples, if the call data of the SIM card number passes through the first detection logic 302, the second detection logic 304, and the third detection logic 306, and, and the PCMD of the call data of the SIM card number indicates that both the first threshold 308, the second threshold 310, and the third threshold 312 are satisfied, the computer device may determine that the SIM card number has even greater possibility to be related to a vSIM fraud.

In implementations, depending on the detection logic that is applied, a potential fraud call may exhibit different fraud call patterns 314. For example, when only the first detection logic is applied, a potential fraud call may exhibit a multiple initial attachment and/or multiple initial attach attempts pattern. In another examples, when the first detection logic and the second detection logic is applied, a potential fraud call may exhibit a multiple initial attachment and/or multiple initial attach attempts pattern and a multiple visited markets pattern. In yet another examples, when the first detection logic and the third detection logic is applied, a potential fraud call may exhibit a multiple initial attachment and/or multiple initial attach attempts pattern and a multiple device change events pattern. In yet another examples, when the first detection logic, the second detection logic, and the third logic is applied, a potential fraud call may exhibit a multiple initial attachment and/or multiple initial attach attempts pattern, a multiple visited markets pattern, and a multiple device change events pattern.

It should be appreciated that the examples as described above are for illustrative purpose. The present disclosure is not intended to be limiting. The orders of the detection logic and the combination of the detection logic may vary. For example, the computer device and/or the MME may apply the second detection logic 304 based on the number of visited markets first and apply the first detection logic 302 to further determine whether a SIM card number or an IMEI number is involved in a fraud activity. In some examples, if the number of initial attachment or the initial attach attempts exceeds the first threshold 308 and reaches a higher threshold, the computer device and/or the MME may label the SIM card number or the IMEI number as being potentially involved in a fraud activity and skip the second detection logic and the third detection logic.

Figure 4:
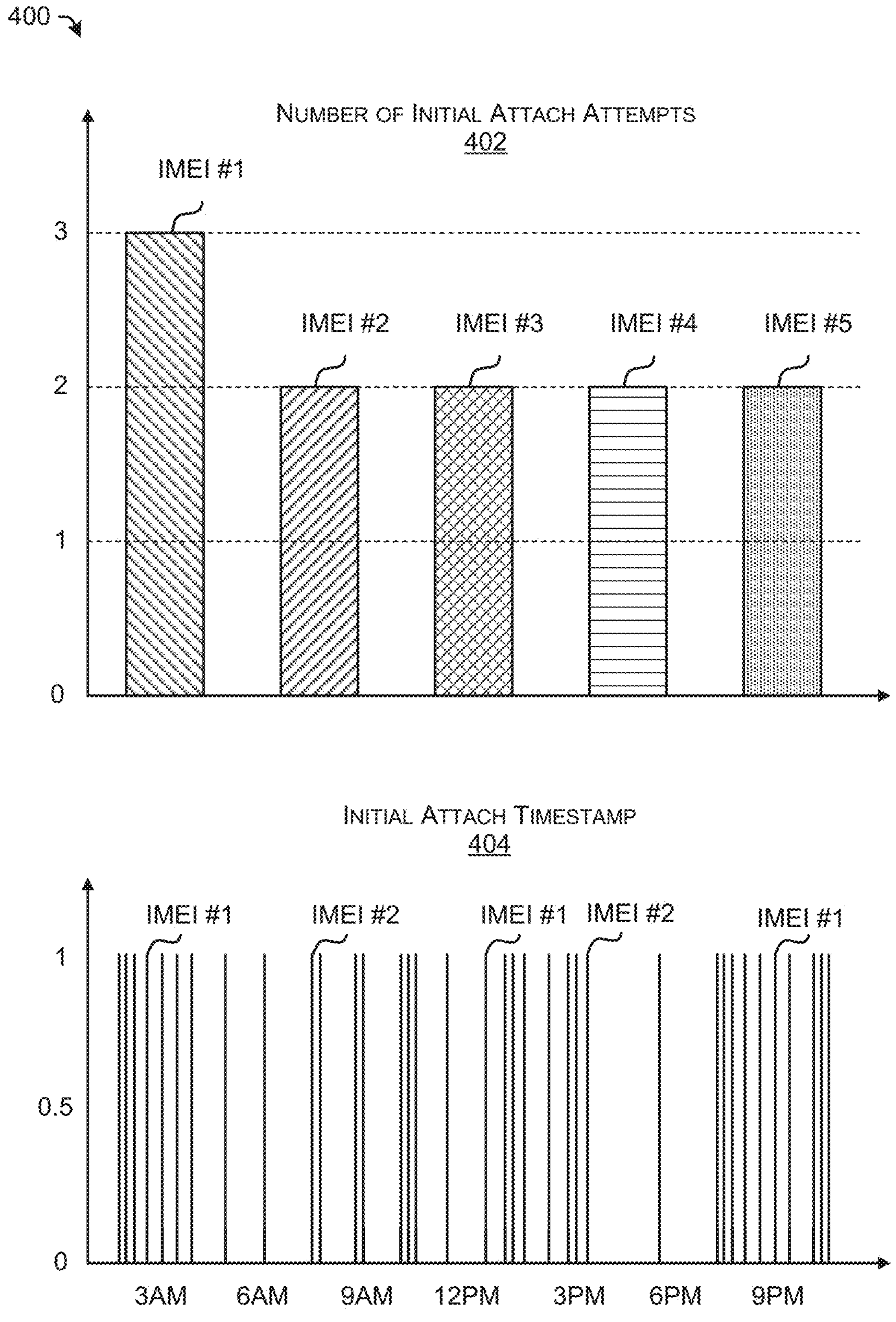
FIG. 4 illustrates example call patterns in a virtual Subscriber Identity Module (vSIM) fraud, according to an implementation of the present disclosure.

FIG. 4 illustrates example call patterns in a virtual Subscriber Identity Module (vSIM) fraud, according to an implementation of the present disclosure.

As illustrated in the example call patterns 400, five IMEI numbers are observed to have more than one initial attach attempt in a day. IMEI #1 is observed to have three initial attach attempts in a day. Each of IMEI #2, IMEI #3, IMEI #4, and IMEI #5 has two initial attach attempts in a day. The three initial attach attempts IMEI #1 are made at around 3 AM, 1 PM, and 9 PM, respectively. The two initial attach attempts by IMEI #2 are made at around 7:30 AM and 3 PM, respectively.

Figure 5:
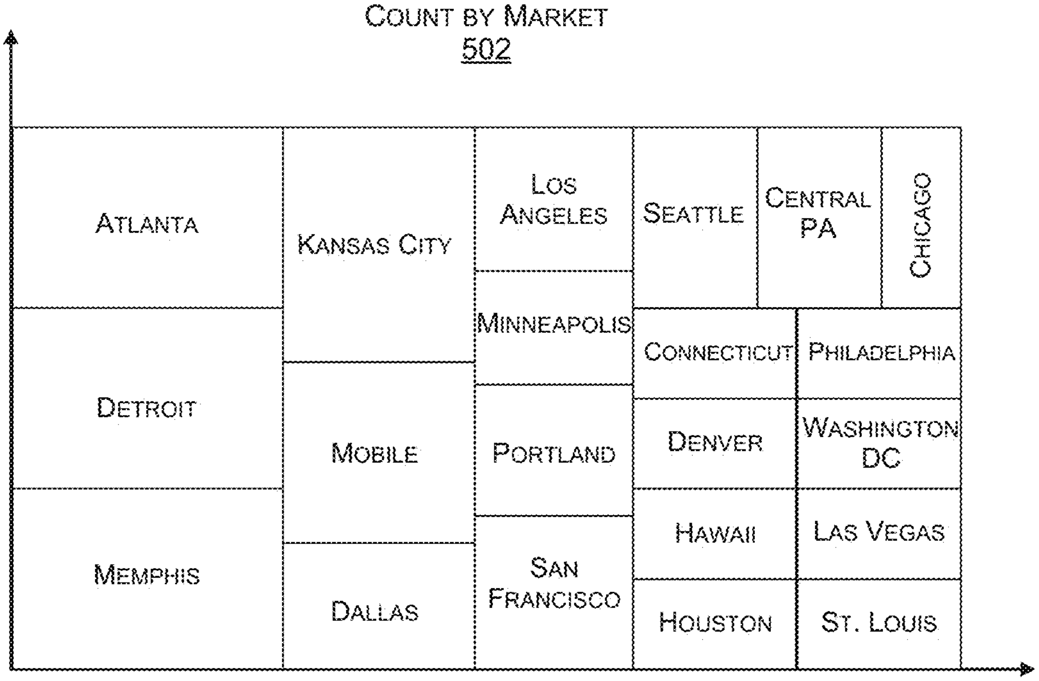
FIG. 5 illustrates other example call patterns in a virtual Subscriber Identity Module (vSIM) fraud, according to an implementation of the present disclosure.
Figure 5:
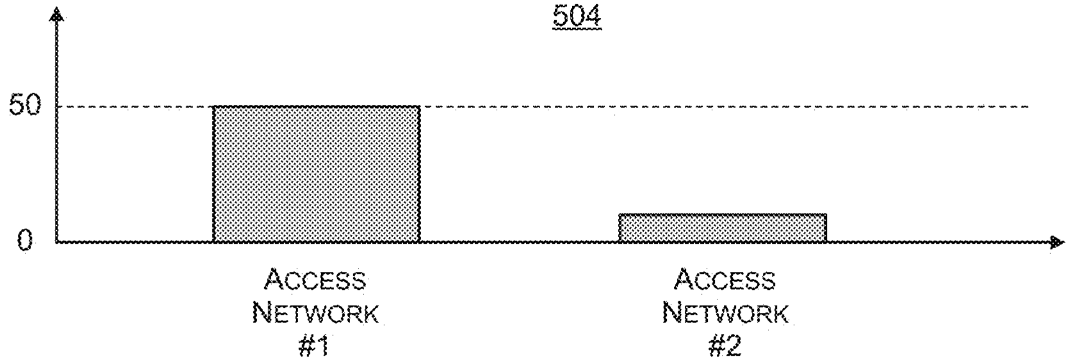

FIG. 5 illustrates other example call patterns in a virtual Subscriber Identity Module (vSIM) fraud, according to an implementation of the present disclosure.

The area of the city illustration in FIG. 5 may represent the count of vSIM fraud calls that are detected therein. As illustrated in the example call patterns 500, Atlanta, Detroit, and Memphis are the three cities that most vSIM fraud calls are detected. When counted by access network, access network #1 receives fifty vSIM fraud calls per day while access network #2 receives approximately ten vSIM fraud calls per day.

Figure 6A:
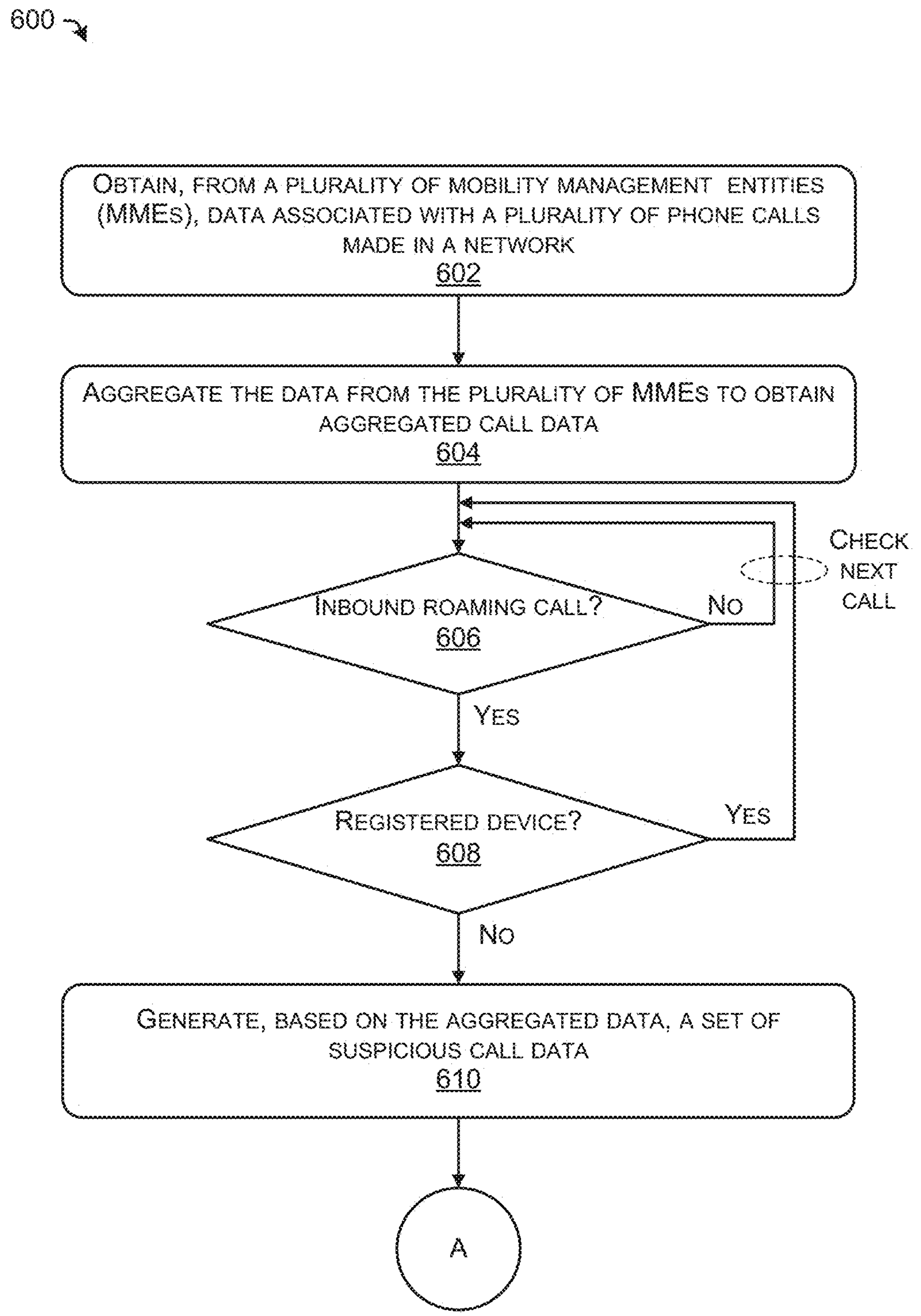
FIGS. 6A-6B illustrate an example process for detecting a virtual Subscriber Identity Module (vSIM) fraud in a Long-Term Evolution (LTE) network, according to another implementation of the present disclosure.
Figure 6B:
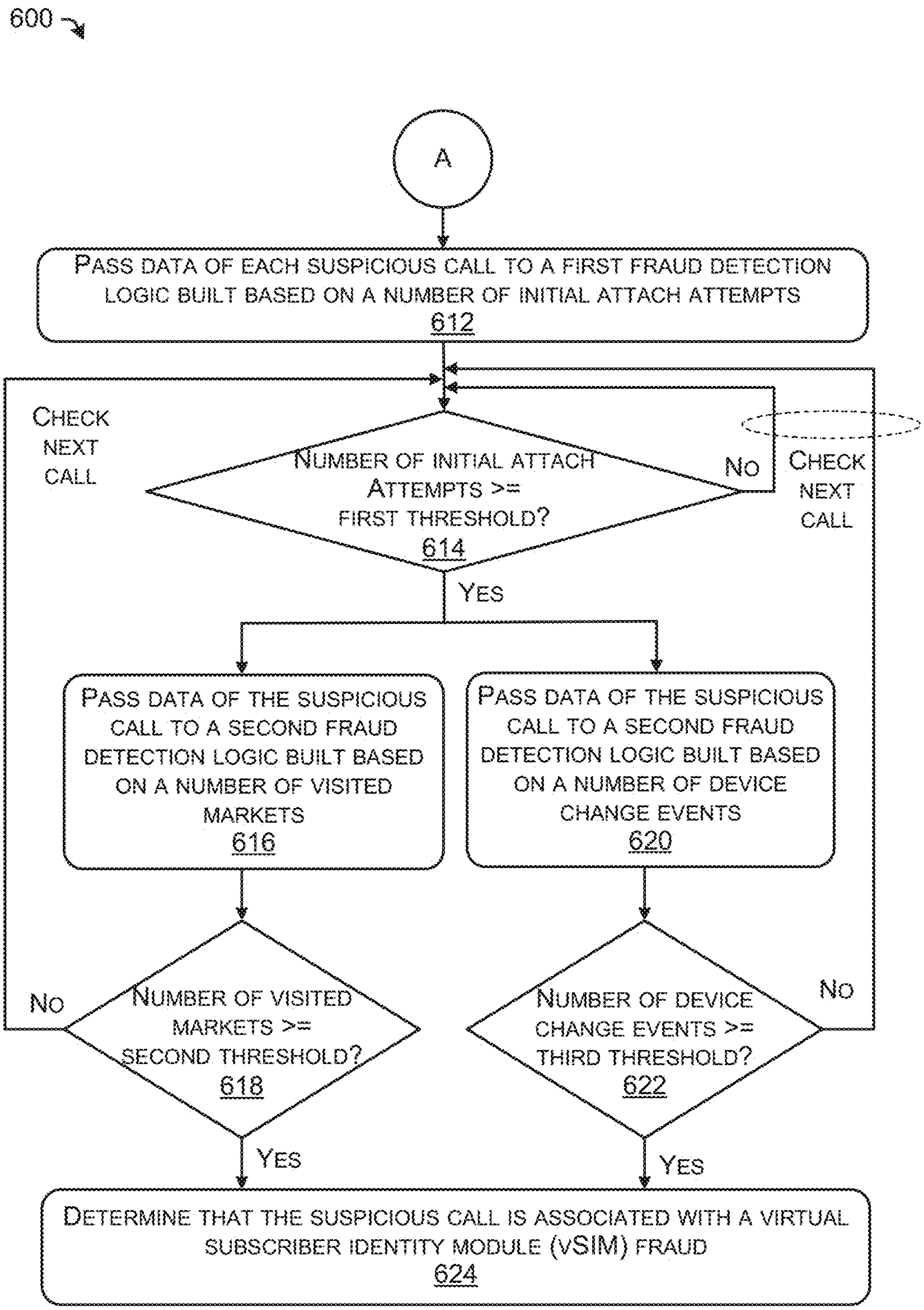

FIGS. 6A-6B illustrate an example process for detecting a virtual Subscriber Identity Module (vSIM) fraud in a Long-Term Evolution (LTE) network, according to another implementation of the present disclosure. The example process 600 may be implemented by a computer device associated with the 4G/LTE network. The computer device may be a centralized computer server. In some examples, the example process 600 may be implemented by an MME of the 4G/LTE network (e.g., MME 112 or MME 118 in FIG. 1).

At operation 602, the process may include obtaining per call measurement data (PCMD) from a plurality of mobility management entity (MME) in a network. In implementations, a centralized computer server or an MME of the 4G/LTE network may periodically collect the PCMD from all of the MMEs in the network, e.g., every day, every week, every month, etc. In some examples, the PCMD associated with a particular call and/or service may include the number of attach requests sent from a UE, the time each attach request is sent, the location of the UE when the UE is attached to the network, the access point from which the UE is attached to the network, a duration of a call session and/or PDU session, etc.

At operation 604, the process may include aggregating the PCMD from the plurality of MMEs to generate aggregated PCMD data. As discussed herein, the plurality of MMEs associated with a wireless service provider may be disposed at various locations. In some examples, a service area may include multiple MMEs (also referred to an MME pool). In a vSIM fraud activity, a same SIM card (e.g., physical SIM card or digital SIM card) and/or an IMEI number may be used by multiple users in different locations. The attach requests associated with the SIM card and/or the IMEI number may be received by multiple MMEs across the network. The centralized computer server or an MME of the 4G/LTE network may aggregate the PCMD associated with the call made in the network and/or service used in the network during a time period to generate aggregated PCMD data. By aggregating the PCMD from all MMEs in the network, signaling activities associated with a SIM card number and/or an IMEI number captured by different MMEs may be merged to facilitate analysis of the mobility behavior associated with the SIM card number and/or the IMEI number.

At operation 606, the process may include determining, for each data item of the aggregated PCMD data, whether it is an inbound roaming call. As discussed herein, when a device roams to an area (e.g., serving area, cell towers, access points, etc.) different from which it is camped under, the device may automatically generate an attach request to an access point in the area. When the attach request is forwarded to an MME in the area, it may be considered as an initial attach request from the device. As a vSIM fraud activity generally involves using multiple devices and/or in multiple locations triggering multiple initial attach requests, the vSIM fraud activity may be observed from those inbound roaming calls. If it is determined that the data item is not an inbound roaming call, the process may check the next data item.

If it is determined that the data item is an inbound roaming call, at operation 608, the process may determine whether the inbound roaming call is made from a known device. As discussed herein, a SIM card number and/or an IMEI number of the device may be linked to a subscriber when the service is activated. The SIM card number and/or the IMEI number of the device may be stored in a home subscriber server (HSS). Upon receiving an attach request, the MME may query the HSS to determine whether the SIM card number and/or the IMEI number of the calling device matches the stored information. If it is determined that the inbound roaming call is made from a known device, the process may check the next data item.

If it is determined that the inbound roaming call is made from an unknown device, at operation 610, the process may generate, based on the aggregation data, a set of suspicious call data. In implementations, the set of suspicious call data may be related to those inbounding roaming calls from unknown devices in the network during the time period.

At operation 612, the process may include passing data of each suspicious call to a first fraud detection logic built based on a number of initial attach attempts. In some examples, multiple initial attach requests may be a frequently observed behavior of a vSIM fraud activity. The centralized computer server or an MME of the 4G/LTE network may build a first fraud detection logic based on the initial attach attempts.

At operation 614, the process may include determining whether the number of initial attach attempts associated with the suspicious call is equal to or greater than a first threshold. In some examples, the first threshold may be preset as maximum eight initial attach attempts in the entire network during a day. In some other examples, the centralized computer server or an MME of the 4G/LTE network may set one or more first threshold to detect excessive initial attach attempts. For example, when the number of initial attach attempts associated with the suspicious call is eight, the centralized computer server or an MME of the 4G/LTE network may apply one or more additional detection logic to the suspicious call. In yet another example, when the number of initial attach attempts associated with the suspicious call meets a threshold higher than the preset first threshold (e.g., maximum twelve initial attach attempts in the entire network during a day), the centralized computer server or an MME of the 4G/LTE network may categorize the suspicious call as a potential vSIM fraud call without applying additional detection logic. In some examples, the centralized computer server or an MME of the 4G/LTE network may also generate a likelihood value that the suspicious call is a potential vSIM fraud call. For instance, the number of initial attach attempts associated with the suspicious call in the entire network in a day satisfying eight may indicate the suspicious call has 50% chance to be a potential vSIM fraud call. Additionally, the number of initial attach attempts associated with the suspicious call in the entire network in a day satisfying twelve may indicate the suspicious call has 75% chance to be a potential vSIM fraud call.

If the number of initial attach attempts associated with the suspicious call is less than a first threshold, the process may check the next call. If the number of initial attach attempts associated with the suspicious call is equal to or greater than a first threshold, at operation 616, the process may include passing data of the suspicious call to a second fraud detection logic built based on a number of visited markets. As discussed herein, in a vSIM fraud activity, the replica of a SIM card number and/or an IMEI number may be emulated through a computer software, which enables any devices, using the replica of a SIM card number and/or an IMEI number, to attach to the network from any locations. In some examples, the centralized computer server or an MME of the 4G/LTE network may build the second detection logic based on the visited markets, e.g., cities. In yet some other examples, the centralized computer server or an MME of the 4G/LTE network may build the second detection logic based on other location representations such as access points, serving areas, regions, etc.

At operation 618, the process may include determining whether the number of visited markets is equal to or greater than a second threshold. In some examples, the centralized computer server or an MME of the 4G/LTE network may set the second threshold as maximum four visited markets in the entire network during a day. In yet other examples, the second threshold may be set as any numbers greater than four visited markets in the entire network during a day. If the number of visited markets is less than a second threshold, the process may check the next call.

If the number of visited markets is equal to or greater than a second threshold, the process continues at operation 624 to determine that the suspicious call is associated with a vSIM fraud. As discussed herein, when a suspicious call associated with a SIM card number and/or an IMEI number exhibits frequent initial attach attempts (e.g., meeting maximum eight initial attach attempts in a day) and presents in multiple markets (e.g., meeting maximum four markets in a day), the centralized computer server or an MME of the 4G/LTE network may determine that suspicious call is associated with a vSIM fraud. In implementations, the centralized computer server or an MME of the 4G/LTE network may configure multiple levels of the second threshold to determine the likelihood value that the suspicious call is a potential vSIM fraud call.

Additionally and/or alternatively, if the number of initial attach attempts associated with the suspicious call is equal to or greater than a first threshold, at operation 620, the process may include passing data of the suspicious call to a third fraud detection logic built based on a number of device change events. As discussed herein, although a user may change the device occasionally, frequent device change in a day may be unusual. In a vSIM fraud activity, the software emulated replica of a SIM card number and/or an IMEI number may be installed by any devices to attach to the network. The centralized computer server or an MME of the 4G/LTE network may set a third threshold with respect to a maximum number of device change events associated with a single SIM card number and/or an IMEI number in the network during a day. In some examples, the third threshold may be set as maximum three device change events in the network during a day. In yet other examples, the third threshold may be set as any numbers greater than three device changes in the entire network during a day.

At operation 622, the process may include determining whether the number of device change events is equal to or greater than a third threshold. If the number of device change events is less than a third threshold, the process may check the next call. If the number of device change events is equal to or greater than a third threshold, the process continues at operation 624 to determine that the suspicious call is associated with a vSIM fraud.

It should be understood that the operations described in FIGS. 6A-6B are for the illustrative purpose. The present disclosure is not intended to be limiting. As discussed herein, the centralized computer server or an MME of the 4G/LTE network may configure one or more of the first threshold, the second threshold, or the third threshold to have different threshold levels. Each of the threshold levels may be applied to determine a likelihood value that a suspicious call is a potential vSIM fraud activity. Further, the data of the suspicious calls may be passed through one or more of the first detection logic, the second detection logic, or the third detection logic in any orders.

Figure 7:
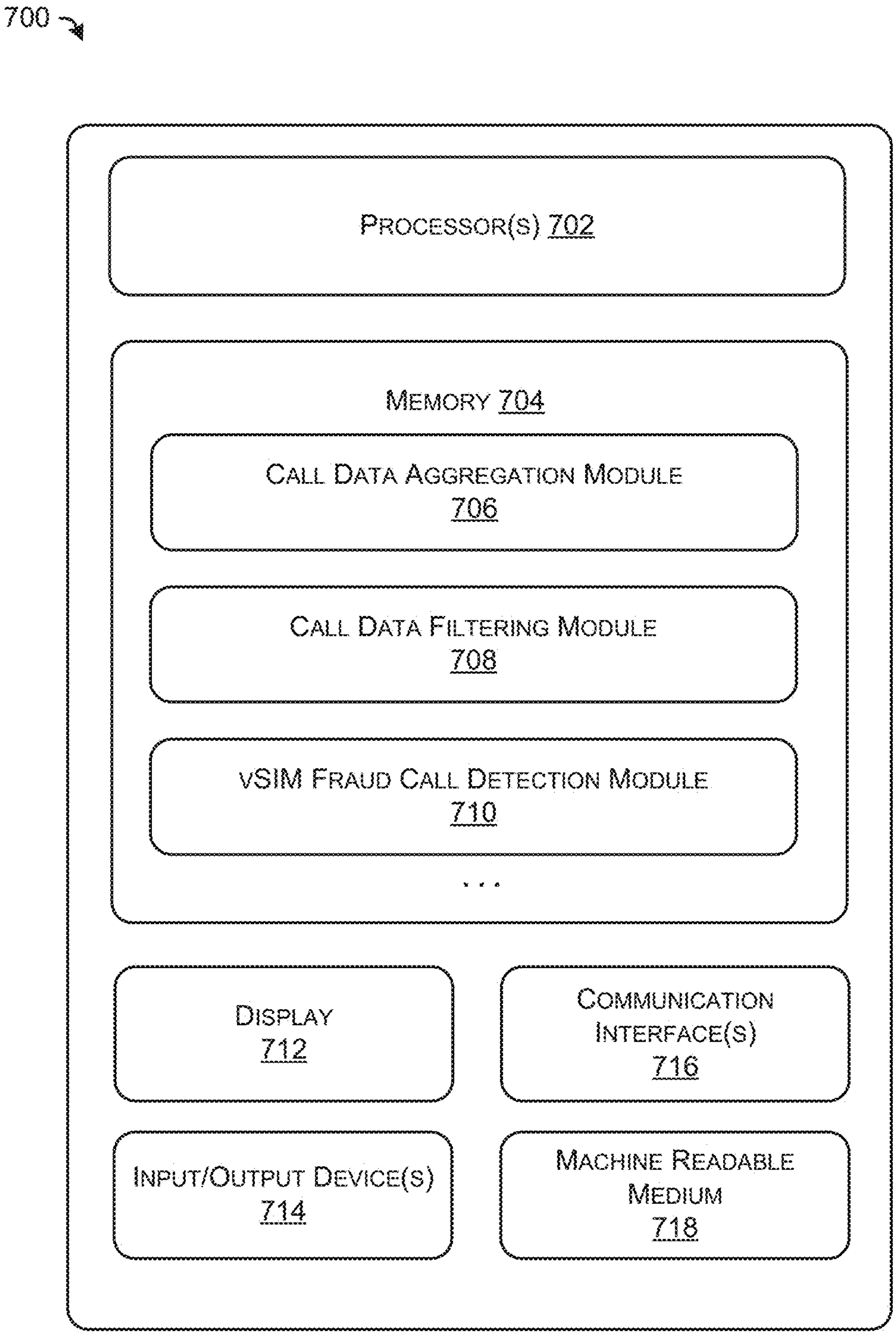
FIG. 7 illustrates an example computer device that implements techniques for detecting a virtual Subscriber Identity Module (vSIM) fraud in a Long-Term Evolution (LTE) network, according to the present disclosure.

FIG. 7 illustrates an example computer device that implements techniques for detecting a virtual Subscriber Identity Module (vSIM) fraud in a Long-Term Evolution (LTE) network, according to the present disclosure. The example computer device 700 may correspond to a computer device or an MME (e.g., MME 112 or MME 118, as shown in FIG. 1) in a 4G/LTE network.

As illustrated in FIG. 7, the computer device 700 may comprise processor(s) 702, a memory 704 storing a call data aggregation module 706, a call data filtering module 708, and a vSIM fraud detection module 710, a display 712, input/output device(s) 714, communication interface(s) 716, and/or a machine readable medium 718.

In various examples, the processor(s) 702 can be a central processing unit (CPU), a graphics processing unit (GPU), or both CPU and GPU, or any other type of processing unit. Each of the one or more processor(s) 702 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 702 may also be responsible for executing all computer applications stored in memory 704, which can be associated with common types of volatile (RAM) and/or nonvolatile (ROM) memory.

In various examples, the memory 704 can include system memory, which may be volatile (such as RAM), non-volatile (such as ROM, flash memory, etc.) or some combination of the two. The memory 704 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computer device 700. Any such non-transitory computer-readable media may be part of the computer device 700.

The call data aggregation module 706 may be configured to collect the per call measurement data (PCMD) from all of the MMEs in the network. The call data aggregation module 706 may collect the PCMD in a daily basis, a weekly basis, or a monthly basis. In some examples, the call data aggregation module 706 may collect the PCMD for vSIM fraud analysis on demand. In implementations, the call data aggregation module 706 may merge the PCMD collected from different MMEs based on the associated SIM card number and/or IMEI number and generate aggregated PCMD in the network during a time period.

The call data filtering module 708 may be configured to filter the aggregated PCMD based on one or more filtering criteria to generate a data set of suspicious calls. The one or more filtering criteria may include inbounding roaming calls with respect to each MME and/or unknown device (e.g., unknown SIM card number and/or unknown IMEI number).

The vSIM fraud detection module 710 may be configured to apply one or more detection logic to the data set of suspicious calls to determine potential vSIM fraud calls and identify the vSIM fraud activity patterns. The one or more detection logic may be based on the count of initial attach attempts in the network during the time period, the count of visited markets in the network during the time period, the count of device change events during the time period, etc. The vSIM fraud detection module 710 may preset the respective thresholds for the one or more detection logic. In some examples, the vSIM fraud detection module 710 may further configure multiple levels of the respective thresholds. In some examples, the vSIM fraud detection module 710 may further configure the combination of the one or more detection logic to determine potential vSIM fraud calls. In yet some other examples, the vSIM fraud detection module 710 may provide and estimated value that indicates the likelihood a suspicious call is a potential vSIM fraud call based on the configuration of the one or more detection logic, the one or more preset thresholds, and/or the multiple levels associated with the one or more preset thresholds.

The communication interface(s) 716 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 716 can be compatible with multiple radio access technologies, such as 5G radio access technologies and 4G/LTE radio access technologies. Accordingly, the communication interfaces 716 can allow the computer device 700 to connect to the 5G system described herein.

Display 712 can be a liquid crystal display or any other type of display commonly used in the computer device 700. For example, display 712 may be a touch-sensitive display screen and can then also act as an input device or keypad, such as for providing a soft-key keyboard, navigation buttons, or any other type of input. Input/output device(s) 714 can include any sort of output devices known in the art, such as display 712, speakers, a vibrating mechanism, and/or a tactile feedback mechanism. Input/output device(s) 714 can also include ports for one or more peripheral devices, such as headphones, peripheral speakers, and/or a peripheral display. Input/output device(s) 714 can include any sort of input devices known in the art. For example, input/output device(s) 714 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 718 can store one or more sets of instructions, such as software or firmware, which embodies any one or more of the methodologies or functions described herein. The instructions can also reside, completely or at least partially, within the memory 704, processor(s) 702, and/or communication interface(s) 716 during execution thereof by the computer device 700. The memory 704 and the processor(s) 702 also can constitute machine readable media 718.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, are not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A device comprising:

a processor; and a non-transitory computer-readable memory storing computer-executable instructions that, when executed by the processor, cause the processor to:

obtain data associated with a plurality of phone calls made in a network;

determine, based on the data, a first set of phone calls that satisfy a first criterion;

determine, based on the data associated with the first set of phone calls, one or more identities that satisfies a second criterion, wherein the second criterion includes at least one of a number of initial attach attempts made from a particular identity, a number of locations where a particular identity called from in a time period, or a number of devices that a particular identity called from in a time period; and determine that the one or more identities are associated with a virtual subscriber identity module (vSIM) fraud.

2. The device of claim 1, wherein the first criterion indicates that a particular phone call is an inbound roaming call with an unknown identity.

3. The device of claim 1, wherein the second criterion includes the number of initial attach attempts made from the particular identity, and the computer-executable instructions, when executed by the processor, further cause the processor to:

determine, based on the data associated with the particular identity, that the number of initial attach attempts made from the particular identity equals to or greater than a threshold; and based on determining that the number of initial attach attempts from the particular identity equals to or greater than a threshold, determine the particular identity is associated with the vSIM fraud.

4. The device of claim 1, wherein the second criterion includes the number of locations where the particular identity called from in the time period, and the computer-executable instructions, when executed by the processor, further cause the processor to:

determine, based on the data associated with the particular identity, that the number of locations where the particular identity called from in the time period equals to or greater than a threshold; and based on that the number of locations where the particular identity called from in the time period equals to or greater than the threshold, determine the particular identity is associated with the vSIM fraud.

5. The device of claim 1, wherein the second criterion includes the number of devices that the particular identity called from in the time period, and the computer-executable instructions, when executed by the processor, further cause the processor to:

determine, based on the data associated with the particular identity, that the number of devices that the particular identity called from in the time period equals to or greater than a threshold; and based on that the number of devices that the particular identity called from in the time period equals to or greater than the threshold, determine the particular identity is associated with the vSIM fraud.

6. The device of claim 1, wherein the data associated with the plurality of phone calls include per call measurement data (PCMD).

7. The device of claim 1, wherein the one or more identities include International Mobile Subscriber Identities (IMSIs).

8. A method implemented by a computer device, comprising:

obtaining data associated with a plurality of phone calls made in a network;

determining, based on the data, a first set of phone calls that satisfy a first criterion;

determining, based on the data associated with the first set of phone calls, one or more identities that satisfies a second criterion, wherein the second criterion includes at least one of a number of initial attach attempts made from a particular identity, a number of locations where a particular identity called from in a time period, or a number of devices that a particular identity called from in a time period; and determining that the one or more identities are associated with a virtual subscriber identity module (vSIM) fraud.

9. The method of claim 8, wherein the first criterion indicates that a particular phone call is an inbound roaming call with an unknown identity.

10. The method of claim 8, wherein the second criterion includes the number of initial attach attempts made from the particular identity, and the method further comprises:

determining, based on the data associated with the particular identity, that the number of initial attach attempts made from the particular identity equals to or greater than a threshold; and based on determining that the number of initial attach attempts from the particular identity equals to or greater than a threshold, determining the particular identity is associated with the vSIM fraud.

11. The method of claim 8, wherein the second criterion includes the number of locations where the particular identity called from in the time period, and the method further comprises:

determining, based on the data associated with the particular identity, that the number of locations where the particular identity called from in the time period equals to or greater than a threshold; and based on that the number of locations where the particular identity called from in the time period equals to or greater than the threshold, determining the particular identity is associated with the vSIM fraud.

12. The method of claim 8, wherein the second criterion includes the number of devices that the particular identity called from in the time period, and the method further comprises:

determining, based on the data associated with the particular identity, that the number of devices that the particular identity called from in the time period equals to or greater than a threshold; and based on that the number of devices that the particular identity called from in the time period equals to or greater than the threshold, determining the particular identity is associated with the vSIM fraud.

13. The method of claim 8, wherein the data associated with the plurality of phone calls include per call measurement data (PCMD).

14. The method of claim 8, wherein the one or more identities include International Mobile Subscriber Identities (IMSIs).

15. A non-transitory computer-readable storage medium storing computer-readable instructions, that when executed by a processor, cause the processor to perform actions comprising:

obtaining data associated with a plurality of phone calls made in a network;

determining, based on the data, a first set of phone calls that satisfy a first criterion;

determining, based on the data associated with the first set of phone calls, one or more identities that satisfies a second criterion, wherein the second criterion includes at least one of a number of initial attach attempts made from a particular identity, a number of locations where a particular identity called from in a time period, or a number of devices that a particular identity called from in a time period; and determining that the one or more identities are associated with a virtual subscriber identity module (vSIM) fraud.

16. The non-transitory computer-readable storage medium of claim 15, wherein the first criterion indicates that a particular phone call is an inbound roaming call with an unknown identity.

17. The non-transitory computer-readable storage medium of claim 15, wherein the second criterion includes the number of initial attach attempts made from the particular identity, and the instructions, when executed by a processor, cause the processor to perform further actions comprising:

determining, based on the data associated with the particular identity, that the number of initial attach attempts made from the particular identity equals to or greater than a threshold; and based on determining that the number of initial attach attempts from the particular identity equals to or greater than a threshold, determining the particular identity is associated with the vSIM fraud.

18. The non-transitory computer-readable storage medium of claim 15, wherein the second criterion includes the number of locations where the particular identity called from in the time period, and the instructions, when executed by a processor, cause the processor to perform further actions comprising:

determining, based on the data associated with the particular identity, that the number of locations where the particular identity called from in the time period equals to or greater than a threshold; and based on that the number of locations where the particular identity called from in the time period equals to or greater than the threshold, determining the particular identity is associated with the vSIM fraud.

19. The non-transitory computer-readable storage medium of claim 15, wherein the second criterion includes the number of devices that the particular identity called from in the time period, and the instructions, when executed by a processor, cause the processor to perform further actions comprising:

determining, based on the data associated with the particular identity, that the number of devices that the particular identity called from in the time period equals to or greater than a threshold; and based on that the number of devices that the particular identity called from in the time period equals to or greater than the threshold, determining the particular identity is associated with the vSIM fraud.

20. The non-transitory computer-readable storage medium of claim 15, wherein the data associated with the plurality of phone calls include per call measurement data (PCMD).

* * * * *